Oct. 25, 1966  D. C. KEATHLY  3,280,521
DRIVE-IN THEATER SCREEN
Filed Sept. 16, 1963
3 Sheets-Sheet 1

Donald C. Keathly
INVENTOR.

BY Clarence A. O'Brien
and Harvey B. Jackson
Attorneys

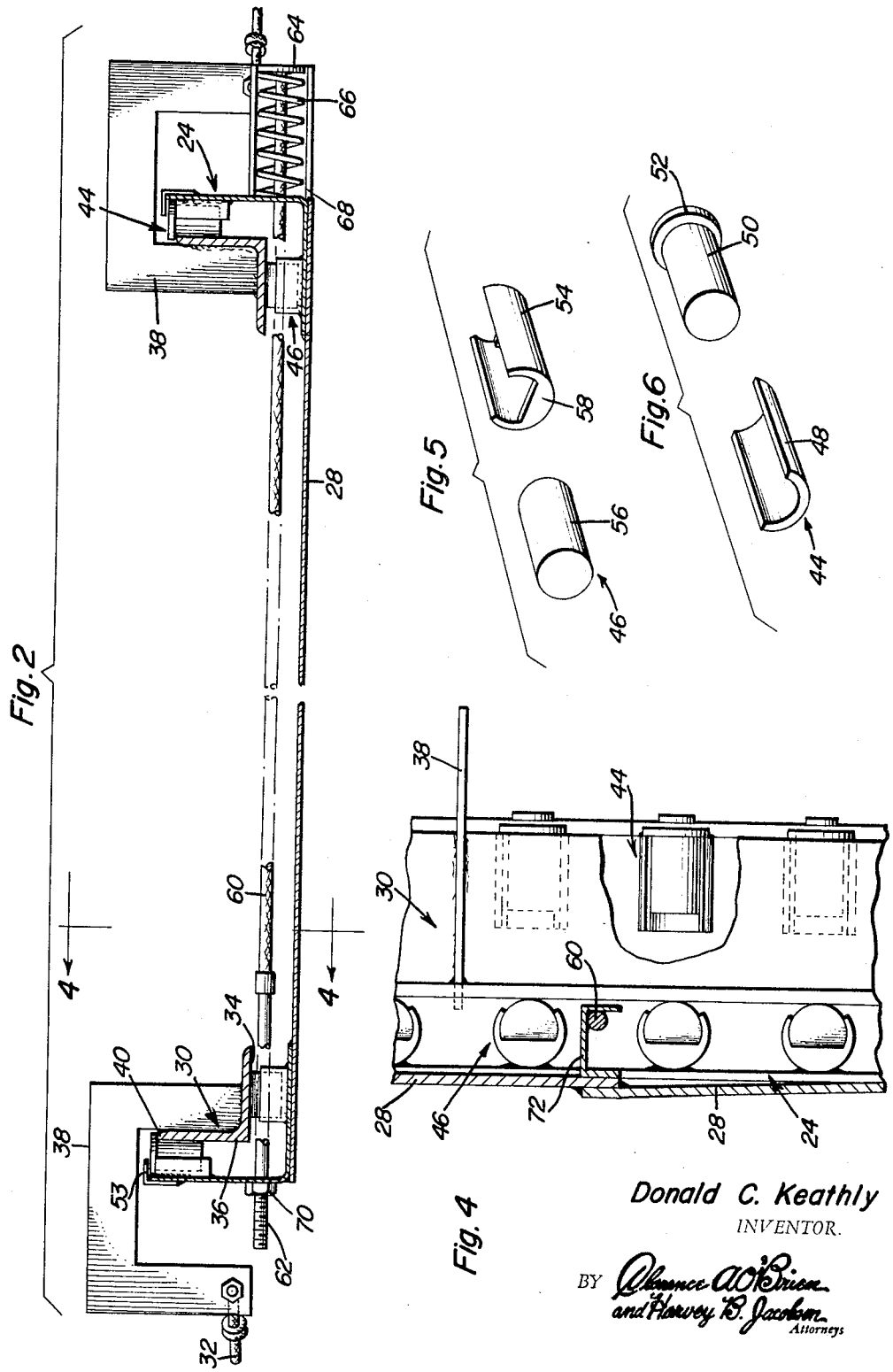

Oct. 25, 1966
D. C. KEATHLY
3,280,521
DRIVE-IN THEATER SCREEN
Filed Sept. 16, 1963
3 Sheets-Sheet 3
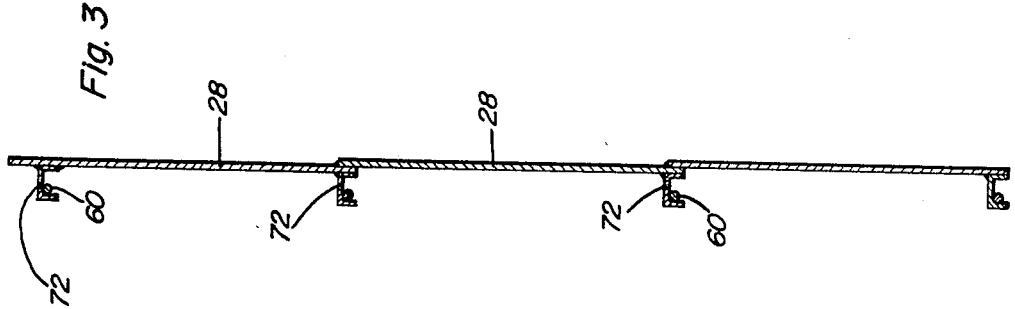
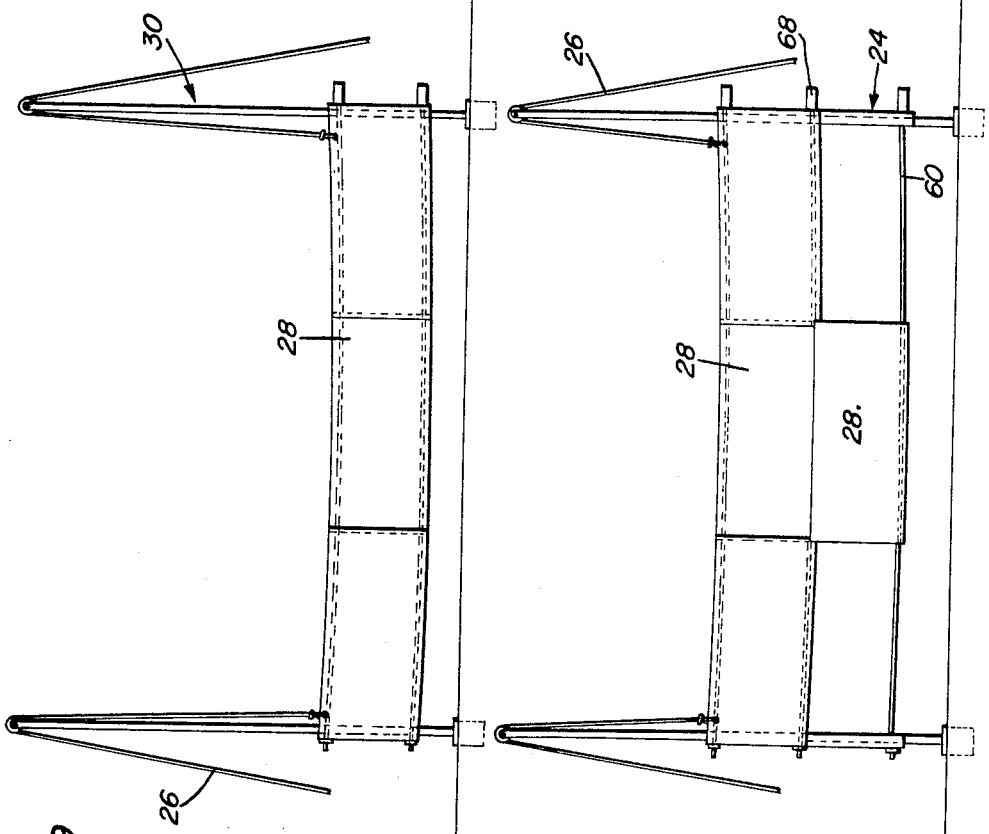
Donald C. Keathly
INVENTOR.
BY Clarence A. O'Brien
and Harvey B. Jacobson
Attorneys 3,280,521
DRIVE-IN THEATER SCREEN
Donald C. Keathly, Rte. 3, Box 623, Pikeville, Ky.
Filed Sept. 16, 1963, Ser. No. 309,181
8 Claims. (Cl. 52—122)

The instant invention, a continuation-in-part of application Ser. No. 158,322, filed Dec. 11, 1961, now abandoned, generally relates to outdoor screens, and is more specifically concerned with a movie screen for drive-in theaters and a method of erecting this screen.

It is a primary object of the instant invention to provide a stable, easy-to-erect and relatively light outdoor screen.

It is also an object of the instant invention to provide for the support of an enlarged outdoor screen solely from two spaced leg structures through a plurality of suspension cables.

Furthermore, an object of the instant invention resides in the provision of a structure which can be almost entirely erected while standing on the ground.

Also, an object of the instant invention is to provide a structure wherein a substantial degree of rigidity is achieved through the utilization of spring means in conjunction with the suspension cables.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an enlarged cross-sectional view taken substantially on a plane passing along line 3—3 in FIGURE 1;

FIGURE 3 is an enlarged cross-sectional view taken substantially on a plane passing along line 3—3 in FIGURE 1;

FIGURE 4 is an enlarged partial cross-sectional view taken substantially on a plane passing along line 4—4 in FIGURE 2;

FIGURE 5 is an exploded perspective view of one form of roller unit;

FIGURE 6 is an exploded perspective view of the other form of roller unit;

FIGURE 9 illustrates an intermediate step in the erection of the screen; and

FIGURE 10 illustrates a subsequent step in the method of erecting the screen.

Figure 1:
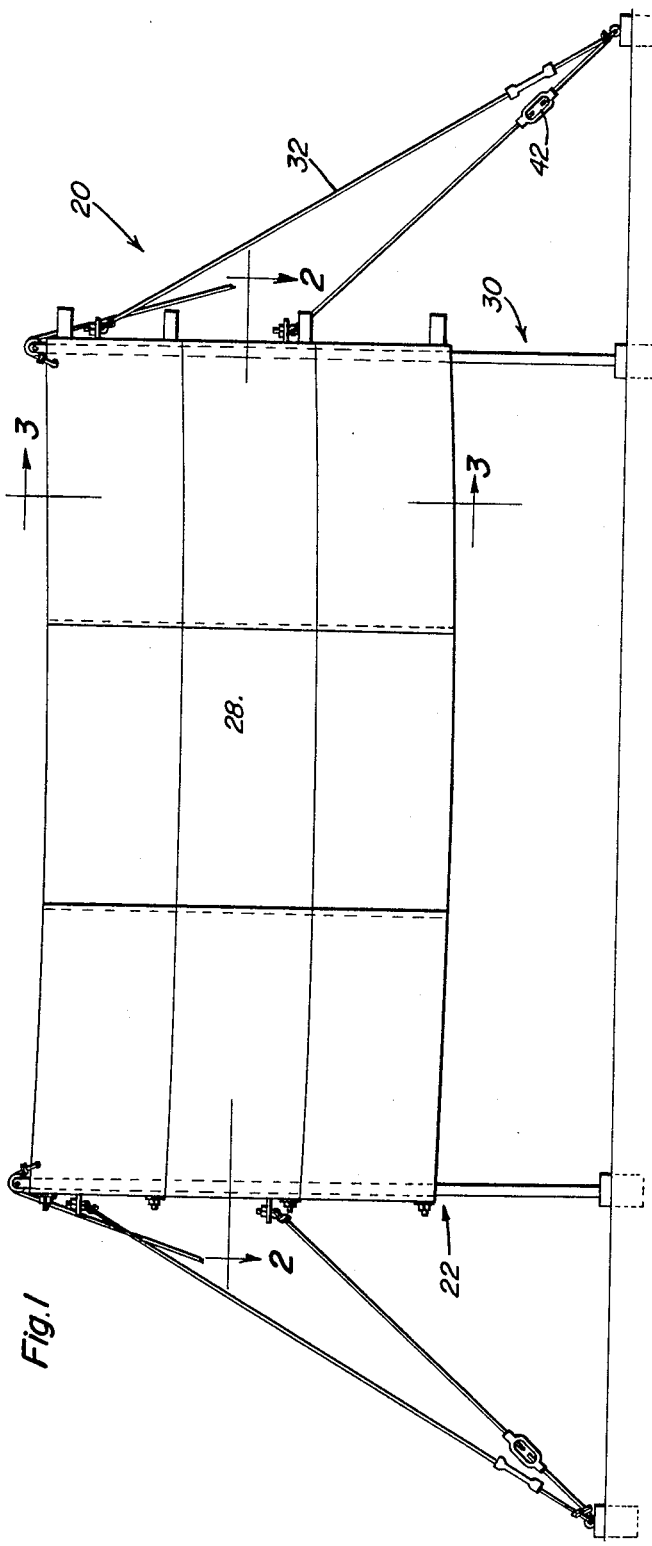
FIGURE 1 is a front elevational view of the erected screen of the instant invention.
Figure 8:
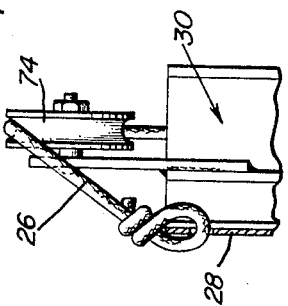
FIGURE 8 is a view taken substantially on a plane passing along the line 8—8 of FIGURE 7.
Figure 7:
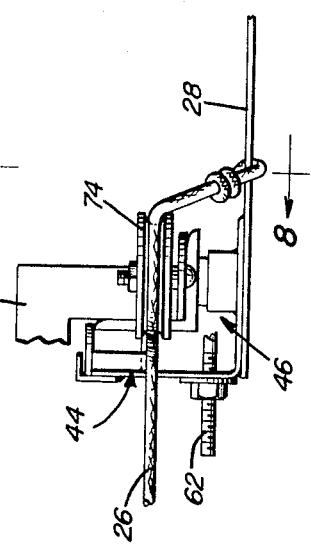
FIGURE 7 is a partial top plan view of one portion of one of the leg units illustrating the pulley means for raising the screen.

Referring now more specifically to the drawings, reference numeral 20 is used to generally designate the erected screen comprising the instant invention. This screen 20 consists basically of spaced vertical leg units 22, vertically movable tramming members 24, suspension cables 26 extending between opposed members 24, and a plurality of panels 28 suspended from the cables 26.

The leg units 22, each including one substantially vertical forward upright or leg 30, are preferably in the form of an A-frame braced by a rigid third leg or guy wires 32 as specifically illustrated in the drawings. Referring specifically to the cross-sectional view of FIGURE 2, it will be noted that each of the uprights or legs 30 includes a forward face 34 and a side face 36 orientated at right angles to the forward face 34, these faces, in the specific embodiment of the drawings, being provided by utilizing an elongated angle member for the legs 30. It will of course be appreciated that various other members are equally adaptable, such as for example, channel members or rectangular members. At spaced points along each leg 30 guy wire brackets 38 are provided, these brackets, U-shaped in form, have one leg thereof secured to the inner surface of the upright with the outer leg of the bracket being spaced outwardly from the leg 30 in a manner so as to provide an uninterrupted front face 34, side face 36 and rear edge 40. The guy wires 32 have their upper ends secured to the outer legs of the guy wire brackets 38 and their lower ends suitably anchored laterally outward from the leg units 22, the guy wires 32 including means, such as turnbuckles 42 for adjusting the tension therein. The lower end of each of the legs 30 is also suitably anchored within the ground.

The screen, consisting of a plurality of panels 28, is erected between the legs or uprights 30 in progressive steps with all but the final securing step being effected from the ground. In effecting the erection, a first pair of tramming members 24, in this instance angle members so as to conform to the angular leg members 30, are provided, each angle member 24 including a first series of roller units 44 mounted on the side flange thereof and rollingly engaged with the side face 36 of the leg 30, and a second series of roller units 46 mounted thereon and rollingly engaged with the forward face 34 of the leg 30.

The roller unit 44 includes an elongated arcuate seat 48 welded to the inner face of the side flange of the angle member 24, and a cylindrical roller 50 having a peripherally enlarged flange 52 thereon, the roller 50 being received within the seat 48 with the flange 52 engaged against both the leg edge 40 and the corresponding edge of the seat 48, the roller 50 of course projecting outwardly beyond the seat 48 for engagement against the side face 36 of the leg 30. In order to retain the roller 50 in position, a keeper member 53 is welded to the member 24 in a manner so as to project parallel to and slightly spaced from the end of the seat 48 in order that the flange 52 of the roller 50 might be retained between the edge of the seat 48 and the keeper plate 53.

Each roller unit 46 includes an elongated arcuate seat 54 and an elongated cylindrical roller 56 rotatably received within the seat 54 and retained therein by end plates 58. As will be appreciated from the drawings, the seat 54 is, in cross-section, slightly more than semi-circular with the general converging of the walls retaining the cylindrical roller 56 therein while allowing a portion of the roller 56 to project therebeyond for engagement against the forward face 34 of the corresponding leg 30, the seat 54 of course being secured, as by welding, to the inner face of the front leg of the tramming member 24.

A pair of elongated steel cables 60 are suspended between the angle members 24, one adjacent the upper edge thereof and one adjacent the lower edge thereof, these cables 60 each having, on a first end thereof, an elongated threaded rod 62 projecting through the side leg of one of the angle members 24, and on the other end thereof, this end projecting through the side leg of the other tramming angle 24, a flat plate 64 bearing against the outer end of a compression spring 66 engaged between the plate 64 and the outer face of the side leg of the angle member 24, a suitable housing 68 being provided for this compression spring. Tension is introduced into each of the cables 60 by means of a nut 70 threaded on the threaded rod 62 with the compression spring 66 functioning so as to compensate for any elongation or stretching of the cable 60 which might develop and otherwise result in an undesirable sagging or loosening of the cable 60.

After the cables 60 are tensioned, the panels 28 are mounted thereon, a sufficient number of panels 28 being provided so as to extend from one member 24 to the other. The panels 28 are engaged over the cables 60 by the use of downwardly opening pocket forming members, preferably in the form of channels 72. Inasmuch as two cables 60 extend between the first pair of members 24, the first row of panels 28 includes both upper and lower channels 72 welded thereto. In mounting the panel 28 on the cable 60, first the center panel is suspended on the cable and the side panels are lapped over the ends of the center panel, this lapping of the panels toward the center of the screen preventing shadows when the screen is used as a movie screen. The panels 28 are tack welded to each other so as to prevent relative movement therebetween with the remote ends of the row of panels being rigidly welded to the outer face of the outer legs of the members 24. While it is contemplated that, in most situations, a plurality of panels be used in forming the above described screen section, if so desired, and if available, a single elongated panel can be provided between the members 24, this single panel being similarly suspended on the cables 60 and welded to the front face of each front leg of the members 24.

After the construction of the first horizontal section of the screen, this section is vertically raised along the uprights 30 through the use of a pair of cables 26 engaged over pulleys 74 fixedly mounted and positioned slightly above the upper ends of the uprights 30, the cables 26 having one end thereof secured to the horizontal unit, the drawings specifically illustrating the cables 26 engaged through small apertures provided adjacent the upper outer corners of the end panels 28. However, the cables can, if preferred, be secured directly to the tramming members 24.

The first horizontal section is raised to a height so as to allow the mounting of a second pair of tramming members or angles 24 immediately beneath and in engagement with the first tramming angle 24, the second angles being welded to the first angles and similarly provided with roller units 44 and 46. This second pair of angles 24 is provided with a single cable 60 therebetween, this second cable 60 being orientated adjacent the lower end of the angles 24 and similarly tensionable through both the threaded rod 62 secured to one end thereof and the compression spring 66 engaged about the other end thereof. After this cable between the second angles 24 has been tensioned, a second row of panels 28 is mounted thereon, the second row of panels 28 having channel members 72 only along the lower edge thereof for engagement over the single cable 60 while the upper edge of the second row of panels thus providing a rigid interconnection between the first and second rows. Next, this second row of panels has the remote ends thereof integrally welded to its angles 24. At this point a pull is exerted on the cables 26 resulting in a raising of both rows of panels simultaneously, and a subsequent row is added in the same manner in which the second row was added.

This procedure is repeated until a screen of the desired height has been obtained at which time the tramming angles or members are rigidly secured to their corresponding uprights 30 in any suitable manner preferably by bolts, and all of the cables 60 are given a final tensioning. If so desired, suitable corrugated panels can be mounted between the lower edge of the screen and the ground in the same manner in which the panels 28 are mounted.

The screen of the instant invention, aside from being quickly and simply erectable as described supra, is intended to possess a substantial degree of lateral stability achieved through both the tensioned cables 60 and the welding of the panels 28 to each other and the tramming members 24. In view of the relatively elongated span between the uprights 30, some deflection will necessarily be present in the cables 60, the panels 28, when suspended on the cables 60 following the deflection curvature with the pocket forming members 72, if so desired, being bowed so as to follow the curvature of the cables 60. The panels 28 are rigidly welded to each other and to the corresponding tramming members 24 in this slightly deflected position prior to their being elevated. After the screen has been elevated into its final position, as mentioned supra, the cables 60 are given a final tightening with this final tensioning of the cables 60 being resisted by the now rigid slightly deflected interconnected panels 28 thus resulting in a rigidifying of the over-all screen. Further, substantial lateral stability is achieved in that any lateral load, such as for example a wind load on the face of the screen, would, under normal circumstances, tend to laterally move or sway the cables 60, however, for the cables to move laterally, they must also rise slightly, this rising of the cables being effectively resisted by the slightly deflected panels 28, thus in effect preventing a movement of the cables 60 and the panels therewith.

From the foregoing, it should be appreciated that a highly novel outdoor screen has been defined, this screen, being both quickly and easily erected and extremely stable when erected, being adaptable for various purposes, such as for example, theater screens and outdoor advertising.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A suspended screen comprising a pair of spaced uprights, a plurality of pairs of elongated members slidably mounted on said uprights, the members of each pair of members being mounted on different uprights in horizontally aligned relation, cable means secured to and extending between the members of each pair, panel means suspended from said cable means, and means for vertically moving said pairs of members on said uprights, said uprights including a pair of angularly related faces, said members including a pair of corresponding angularly related faces positionable parallel to said upright faces, and roller means fixed to each member face and rollingly engageable with the upright faces.

2. The structure of claim 1 wherein one end of each cable is adjustably secured to the corresponding member, and the other end of each cable is resiliently secured through a spring means.

3. In the erection of a screen between two spaced uprights, the steps of providing a pair of vertically slidable members, one on each upright, suspending a cable between the members, suspending a plurality of panels from said cable along the length thereof, rigidly interconnecting the panels, rigidly securing the remote ends of the panels to the members, raising the combined members, cable and panels, mounting a second pair of vertically slidable members, one on each upright, securing each of said second members to the member thereabove, suspending a second cable between the second members, suspending a second plurality of panels from the second cable along the length thereof, rigidly securing the second panels to each other and the first mentioned panels, rigidly securing the remote ends of the second panels to the second members, and raising the interconnected members along with their cables and panels.

4. The structure of claim 1 wherein one face of each of the uprights generally parallels the panel means and the other face thereof extends laterally rearward from one edge of said one face, said other face terminating in a rearwardly facing edge portion, the roller means engaging said other face including an enlarged edge flange rollingly engaging against said rearwardly facing edge portion.

5. Suspended screen construction comprising a pair of spaced uprights, a pair of vertically elongated members, one mounted for vertical movement on each upright, said members being in horizontal alignment with each other, panel means secured to and extending between said members, said uprights including a pair of angularly related faces, each member including a pair of corresponding angularly related faces positionable parallel to the faces of the corresponding upright, roller means fixed to each member face and rollingly engaging the adjacent upright face, and means for vertically moving said pair of members along said uprights.

6. Suspended screen construction comprising a pair of spaced uprights, a pair of elongated members slidably mounted on said uprights, said members being mounted on different uprights in horizontally aligned relation, tensionable cable means secured to and extending between the members, panel means suspended from said cable means, said panel means being rigidly interconnected and the outermost ends of the panel means being rigidly affixed to the members, and means for vertically moving said pair of members on said uprights.

7. The construction of claim 6 including a second pair of elongated members slidably mountable on said uprights below said first pair of members subsequent to an initial raising of said first pair of members, means for rigidly securing said second pair of members to said first pair of members in vertical alignment therewith, and means for rigidly mounting panel means to and between said second pair of members.

8. In the erection of a screen between two spaced uprights, the steps of providing a pair of vertically slidable members, one on each upright, suspending a cable between the members, suspending a plurality of panels from said cable along the length thereof, rigidly interconnecting the panels, rigidly securing the remote ends of the panels to the members, raising the combined members, cable and panels, mounting a second pair of vertically slidable members, one on each upright, securing each of said second members to the member thereabove, suspending a second cable between the second members, suspending a second plurality of panels from the second cable along the length thereof, rigidly securing the second panels to each other, rigidly securing the remote ends of the second panels to the second members, and raising the interconnected members along with their cables and panels.

References Cited by the Examiner

UNITED STATES PATENTS

| 340,788 | 4/1886 | Jory | 52—38 X |
| 371,969 | 10/1887 | Prewitt | 101—128 |

FOREIGN PATENTS 589,868  4/1925  France.

RICHARD W. COOKE, JR., *Primary Examiner.*